(12) United States Patent (10) Patent No.: US 9,260,197 B2
Thompson et al. (45) Date of Patent: Feb. 16, 2016

(54) SYSTEMS AND METHODS FOR DISPLAYING IN-FLIGHT NAVIGATION PROCEDURES

(71) Applicant: The Boeing Company, Seal Beach, CA (US)

(72) Inventors: Theodore Bruce Thompson, Highlands Ranch, CO (US); Jeffrey L. Williams, Parker, CO (US); Catherine Marie Barnes, Franktown, CO (US); Steven Curtis Spackman, Aurora, CO (US); Alexander Korolev, Aurora, CA (US)

(73) Assignee: The Boeing Company, Chicago, IL (US)

( * ) Notice: Subject to any disclaimer, the term of this patent is extended or adjusted under 35 U.S.C. 154(b) by 109 days.

(21) Appl. No.: 13/676,588

(22) Filed: Nov. 14, 2012

(65) Prior Publication Data

US 2014/0132427 A1 May 15, 2014

(51) Int. Cl.
| | |
|---|---|
| *G01C 21/00* | (2006.01) |
| *G08B 23/00* | (2006.01) |
| *G06F 19/00* | (2011.01) |
| *G01S 13/00* | (2006.01) |
| *B64D 45/00* | (2006.01) |
| *G08G 5/00* | (2006.01) |
| *G08G 5/02* | (2006.01) |
| *G01C 23/00* | (2006.01) |

(52) U.S. Cl.
CPC ............. *B64D 45/00* (2013.01); *G08G 5/0021* (2013.01); *G08G 5/025* (2013.01); *G01C 23/005* (2013.01)

(58) Field of Classification Search
CPC .. B64D 45/00; B64D 45/0005; G08G 5/0039; G01C 23/00; G05D 1/0676; G01S 13/9303; G01S 11/08; G01S 13/781; G01S 13/913; G01S 13/762

USPC ........ 340/945, 971–976, 963; 701/14, 16–18; 342/29–38

See application file for complete search history.

(56) References Cited

U.S. PATENT DOCUMENTS

| | | | | |
|---|---|---|---|---|
| 5,057,835 A | * | 10/1991 | Factor | G01C 23/00 340/990 |
| 6,922,631 B1 | * | 7/2005 | Dwyer | G01C 23/00 340/971 |

(Continued)

FOREIGN PATENT DOCUMENTS

| | | |
|---|---|---|
| EP | 2048477 A2 | 4/2009 |
| EP | 2253938 A1 | 11/2010 |

OTHER PUBLICATIONS

International Search Report and Written Opinion of International Application No. PCT/US2013/050915; Oct. 9, 2013; 11 pages.

(Continued)

*Primary Examiner* — George Bugg
*Assistant Examiner* — Munear Akki
(74) *Attorney, Agent, or Firm* — Armstrong Teasdale LLP

(57) ABSTRACT

A computing device for displaying procedures for an aircraft is provided. The computing device includes a presentation interface, a user input interface, and a processing device coupled to the presentation interface and to the user input interface. The processing device is configured to cause the presentation interface to display an initial procedure display, and in response to a triggering event, cause the presentation interface to display an adjusted procedure display that emphasizes a predetermined portion of a procedure.

14 Claims, 5 Drawing Sheets

(56) References Cited

U.S. PATENT DOCUMENTS

| | | | |
|---|---|---|---|
| 7,640,082 B2* | 12/2009 | Dwyer | G01C 23/00 340/945 |
| 7,693,621 B1* | 4/2010 | Chamas | G08G 5/0021 340/951 |
| 7,769,501 B2 | 8/2010 | Lusardi et al. | |
| 7,876,238 B2 | 1/2011 | Vandenbergh et al. | |
| 8,000,854 B2 | 8/2011 | Majka | |
| 2004/0039523 A1* | 2/2004 | Kainuma | G08G 1/0969 701/459 |
| 2005/0273220 A1* | 12/2005 | Humbard | G01C 23/00 701/3 |
| 2006/0265110 A1* | 11/2006 | Ferro | G01C 23/00 701/3 |
| 2007/0168120 A1 | 7/2007 | Vandenbergh et al. | |
| 2007/0260364 A1* | 11/2007 | Dwyer | G01C 23/00 701/3 |
| 2010/0161160 A1* | 6/2010 | Wilson | G01C 23/005 701/15 |
| 2010/0220113 A1 | 9/2010 | Kennedy | |
| 2010/0280753 A1* | 11/2010 | Chytil | G01C 23/00 701/532 |
| 2011/0001636 A1* | 1/2011 | Hedrick | B60K 37/02 340/971 |
| 2011/0109576 A1 | 5/2011 | Giannelli | |
| 2011/0313597 A1* | 12/2011 | Wilson | G01C 23/00 701/3 |

OTHER PUBLICATIONS

Summary of SAE ARP 5289A-2011 Electronic Aeronautical Symbols; http://webstore.ansi.org; retrieved from internet Nov. 26, 2011; 1 page.

* cited by examiner

SYSTEMS AND METHODS FOR DISPLAYING IN-FLIGHT NAVIGATION PROCEDURES

BACKGROUND

The field of the disclosure relates generally to in-flight navigation procedures, and more specifically, to methods and system for use in displaying these procedures in a graphical form.

In-flight navigation procedures are typically depicted on a cockpit display or paper charts to a pilot and/or co-pilot as pre-composed and non-interactive images. Such images typically contain relatively large quantities of information which may be applicable to multiple procedures and multiple flight paths.

The pilot, co-pilot, and/or other personnel may be required to visually and mentally digest and filter non-relevant information from the displayed procedures to focus on information that applies specifically to the operational situation at hand. For example, if the aircraft being flown is a category "C" aircraft, then information pertaining to the category "A", "B" and "D" aircraft is not needed by the pilot or co-pilot. As will be appreciated, this can significantly add to the cognitive workload of the pilot and/or co-pilot during normal flight operations and/or when performing a flight maneuver, such as a landing approach, in the aircraft.

Even within digital Electronic Flight Bag (EFB) devices, at least some known chart displays do not allow real-time user interaction to filter information, to alter displayed data, or to use real-time and current operational parameters to declutter displayed procedures automatically and dynamically. Thus, such charts still require users to cognitively filter out a relatively large amount of information that is not pertinent to the instant situation.

BRIEF DESCRIPTION

In one aspect, a computing device for displaying procedures for an aircraft is provided. The computing device includes a presentation interface, a user input interface, and a processing device coupled to the presentation interface and to the user input interface. The processing device is configured to cause the presentation interface to display an initial procedure display, and in response to a triggering event, cause the presentation interface to display an adjusted procedure display that emphasizes a predetermined portion of a procedure.

In another aspect, a processing device for displaying procedures for an aircraft is provided. The processing device is configured to display an initial procedure display on a presentation interface, detect a triggering event, and in response to the detected triggering event, display an adjusted procedure display that emphasizes a predetermined portion of a procedure on the presentation interface.

In yet another aspect, a method for displaying procedures for an aircraft is provided. The method includes displaying, on a presentation interface, an initial procedure display, detecting, at a processing device coupled to the presentation interface, a triggering event, and displaying, in response to the detected triggering event, an adjusted procedure display on the presentation interface, wherein the adjusted procedure display emphasizes a predetermined portion of a procedure.

The features, functions, and advantages that have been discussed can be achieved independently in various implementations or may be combined in yet other implementations, further details of which can be seen with reference to the following description and drawings.

DETAILED DESCRIPTION

The systems and methods described herein enable displaying an initial procedure display and an adjusted procedure display. The adjusted procedure display emphasizes a predetermined portion of a procedure, and is displayed in response to a triggering event. The procedure may be emphasized by modifying the scaling and/or modifying the information shown relative to the initial procedure display. By emphasizing a predetermined portion of the procedure element such as a segment, phase, or flight path of the procedure, the systems and methods described herein aide a user in viewing and comprehending the displayed procedure.

Exemplary technical effects of the methods and systems described herein include at least one of (a) displaying an initial procedure display; (b) detecting a triggering event; and (c) displaying, in response to the detected triggering event, an adjusted procedure display, wherein the adjusted procedure display emphasizes a predetermined portion of the procedure.

Figure 1:
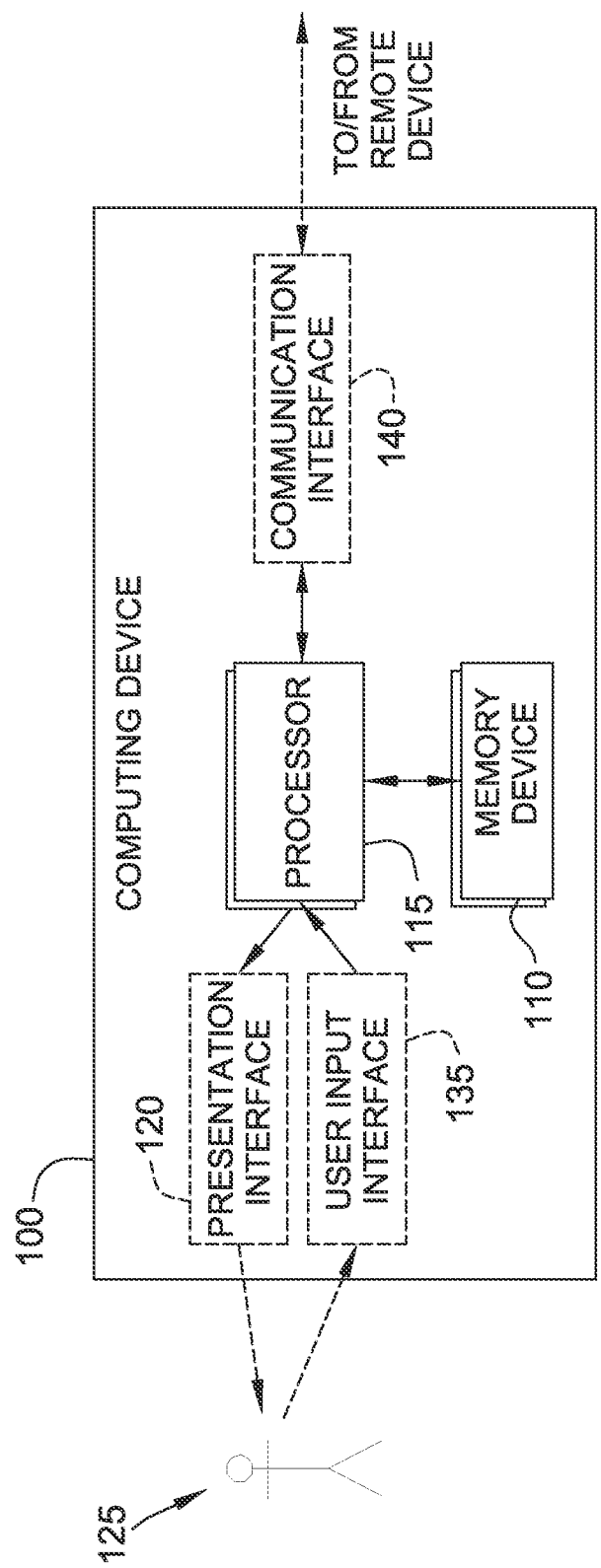
FIG. 1 is a block diagram of an exemplary computing device.

FIG. 1 is a block diagram of an exemplary computing device 100 for use in displaying one or more procedures for an aircraft (not shown). As described in more detail below, computing device 100 dynamically displays the one or more procedures. Charts or informational displays form a graphical depiction of a navigation procedure or intended route of flight for an aircraft. Notably, as used herein, procedures are separate and distinct from aircraft navigational displays. In general, procedures include more additional, comprehensive information as compared to general aircraft navigational displays. Further, organizations such as the Federal Aviation Administration (FAA) typically require pilots to file and carry a flight plan for all flights conducted under Instrument Flight Rules (IFR), and these flight plans include a plurality of procedures and all related information.

In the exemplary implementation, computing device 100 displays a missed approach procedure. While a missed approach procedure is discussed in detail herein, computing device 100 may display any suitable segment, phase, or flight path of an arrival, departure and/or approach procedure, including, but not limited to procedures that are part of a standard instrument departure (SID) or standard terminal arrival route (STAR). For example, in one implementation, computing device 100 displays multiple approach segments including an initial approach, an intermediate, and a final approach segment of an approach procedure.

In the exemplary implementation, computing device 100 is part of an electronic flight bag (EFB) that displays procedures for one or more pilots onboard an aircraft. Alternatively, computing device 100 may display procedures for other users, including, for example, air traffic control operators.

Computing device 100 includes at least one memory device 110 and a processor 115 that is coupled to memory device 110 for executing instructions. In some implementations, executable instructions are stored in memory device 110. In the exemplary implementation, computing device 100 performs one or more operations described herein by programming processor 115. For example, processor 115 may be programmed by encoding an operation as one or more executable instructions and by providing the executable instructions in memory device 110.

Processor 115 may include one or more processing units (e.g., in a multi-core configuration). Further, processor 115 may be implemented using one or more heterogeneous processor systems in which a main processor is present with secondary processors on a single chip. As another illustrative example, processor 115 may be a symmetric multi-processor system containing multiple processors of the same type. Further, processor 115 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. Processor 115 controls the display of the one or more procedures on computing device 100, as described in detail herein.

In the exemplary implementation, memory device 110 is one or more devices that enable information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, application source code, application object code, source code portions of interest, object code portions of interest, configuration data, execution events and/or any other type of data.

In the exemplary implementation, computing device 100 includes a presentation interface 120 that is coupled to processor 115. Presentation interface 120 presents information, such as procedures, to a user 125. For example, presentation interface 120 may include a display adapter (not shown) that may be coupled to a display device, such as a cathode ray tube (CRT), a liquid crystal display (LCD), an organic LED (OLED) display, and/or an "electronic ink" display. In some implementations, presentation interface 120 includes one or more display devices. In the exemplary implementation, presentation interface 120 displays one or more procedures. User 125 may include a pilot, dispatch operator, air traffic control operator, and/or other users involved in the flight of the aircraft.

In the exemplary implementation, computing device 100 includes a user input interface 135 that is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 120 and user input interface 135.

In the exemplary implementation, computing device 100 includes a communication interface 140 coupled to processor 115. Communication interface 140 communicates with one or more remote devices. To communicate with remote devices, communication interface 140 may include, for example, a wired network adapter, a wireless network adapter, and/or a mobile telecommunications adapter.

Figure 2:
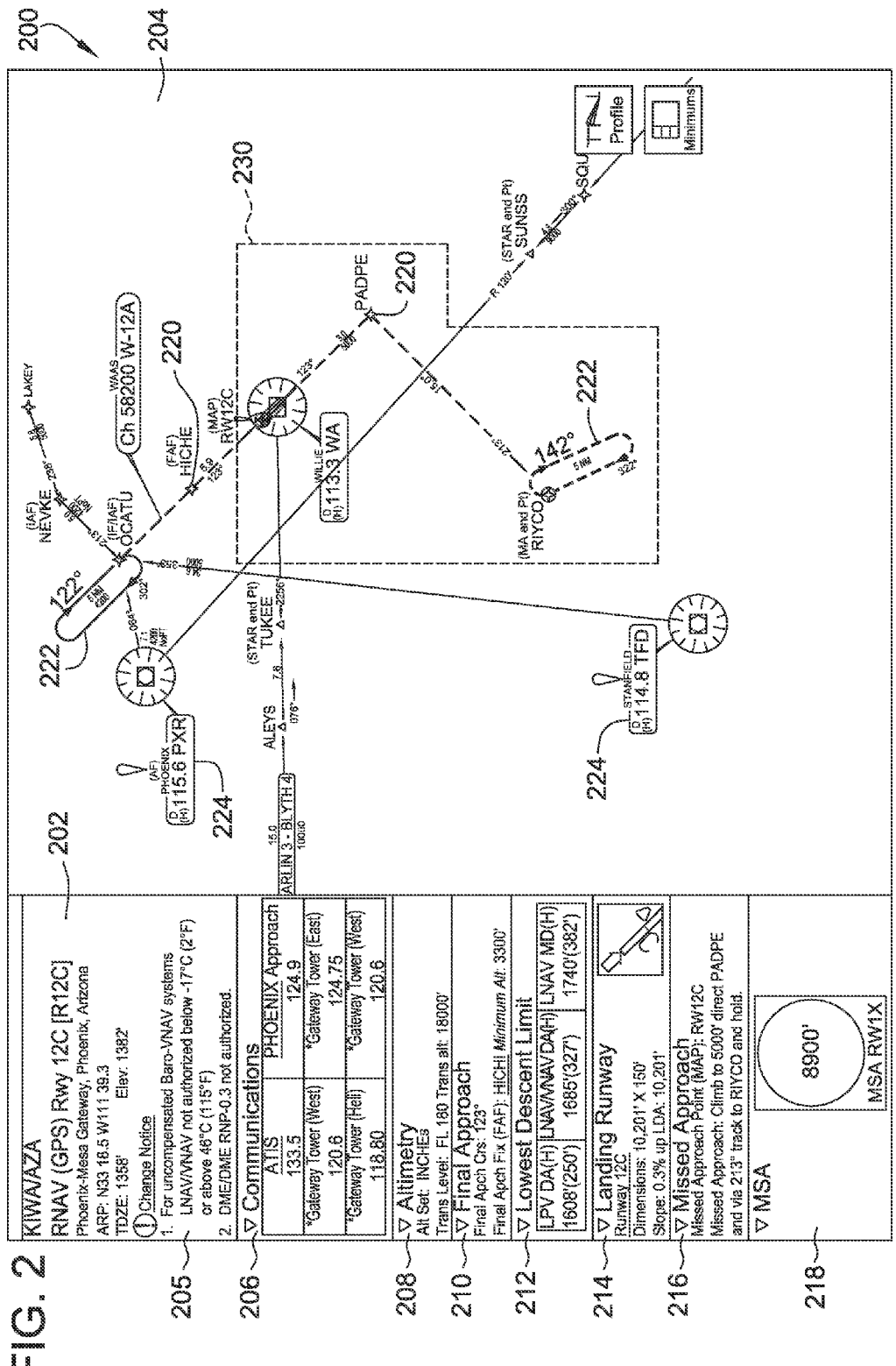
FIG. 2 is an initial procedure display that may be displayed using the computing device shown in FIG. 1.

FIG. 2 is an exemplary initial procedure display 200 for approach procedures. Initial procedure display 200 is displayed on presentation interface 120 by processor 115 (both shown in FIG. 1). In the exemplary implementation, initial procedure display 200 includes a briefing strip 202 and an overhead view 204 (also referred to as a planview). Moreover, in the exemplary implementation, initial procedure display 200 includes information for one or more procedures or segments of a given procedure. Briefing strip 202 includes textual information pertinent to the procedure(s), including limits, restrictions, and equipment notes 205 communications information 206, altimetry information 208, final approach information 210, lowest descent limit information 212, landing runway information 214, missed approach information 216, and minimum safe altitude information 218, in the exemplary implementation.

Overhead view 204, as shown in FIG. 2, includes information for a plurality of procedures or segments, phases, or flight paths of procedures (e.g., initial approach, intermediate approach, final approach, and missed approach). Such information includes, for example, waypoints 220, holding patterns 222, and airports 224. Overhead view 204 also includes a missed approach procedure (i.e., transition or segment) section 230 that includes information related to the missed approach procedure (i.e., the procedure implemented when an aircraft flies a final approach procedure but aborts landing).

Figure 3:
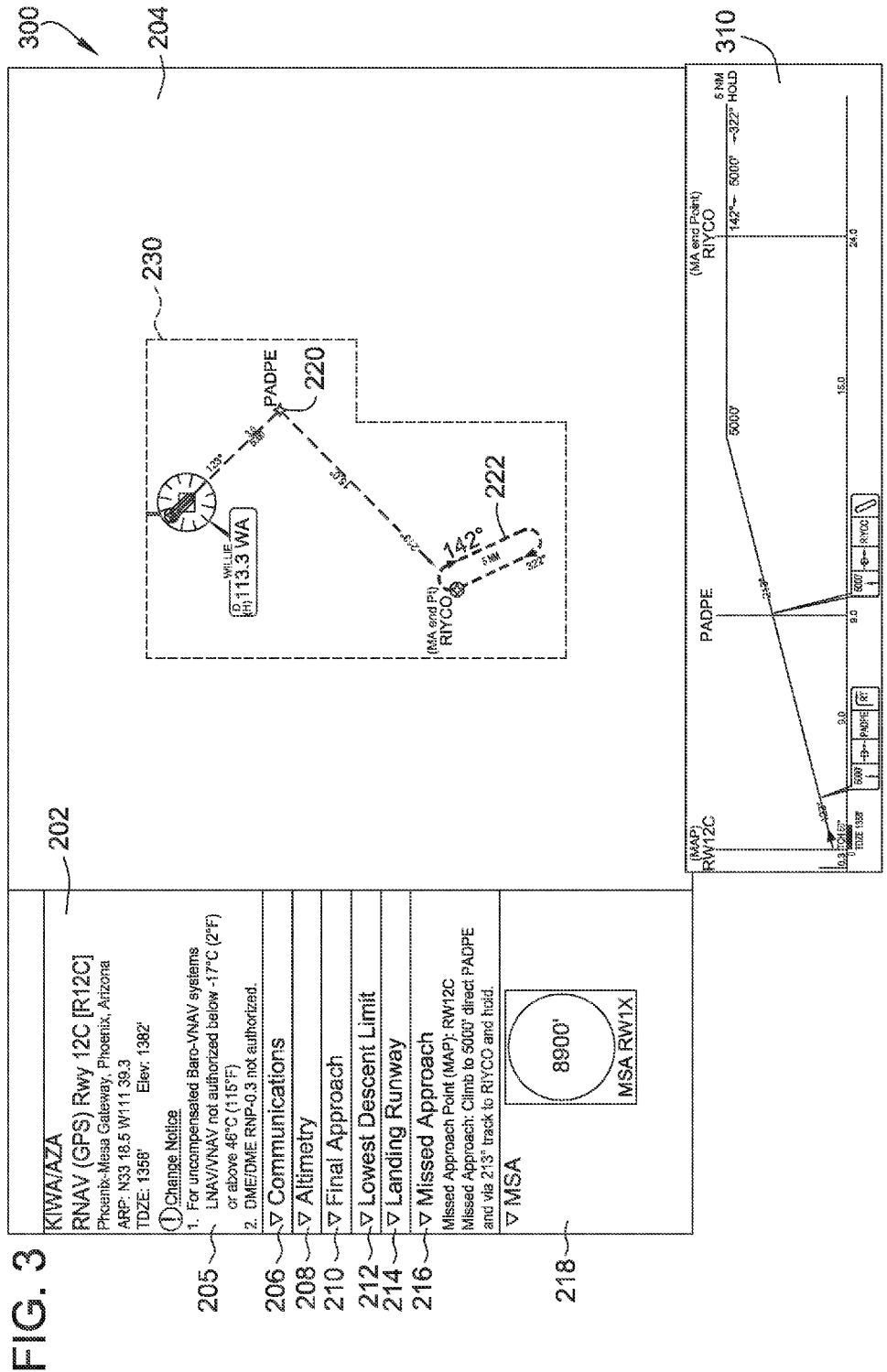
FIG. 3 is an adjusted procedure display that may be displayed using the computing device shown in FIG. 1.

FIG. 3 is an adjusted procedure display 300 that emphasizes a predetermined portion of a procedure, as compared to initial procedure display 200. In the exemplary implementation, adjusted procedure display 300 emphasizes the missed approach procedure. Alternatively, adjusted procedure display 300 may emphasize any suitable procedure.

As compared with initial procedure display 200 (shown in FIG. 2), adjusted procedure display 300 includes less information than initial procedure display 200. Specifically, in the exemplary implementation, while missed approach section 230 is still displayed in overhead view 204, other information that is not associated with the missed approach procedure is not displayed in adjusted procedure display 300. Excluding information that is extraneous to the procedure (i.e., the missed approach procedure in the exemplary implementation) is also referred to herein as decluttering the procedure display. Accordingly, adjusted procedure display 300 is decluttered relative to initial procedure display 200.

In the exemplary implementation, processor 115 also dynamically scales overhead view 204 to focus on missed approach section 230 in adjusted procedure display 300. That is, to aid user 125, missed approach section 230 is resized and centered in overhead view 204 of adjusted procedure display 300, as compared to initial procedure display 200. Overhead view 204 is scaled to optimize presentation of the displayed procedure for user 125. Adjusted procedure display 300 also includes a profile display portion 310 in the exemplary implementation. In FIG. 3, profile display portion 310 includes a vertical profile of the missed approach procedure.

The display of briefing strip 202 also changes from initial procedure display 200 to adjusted procedure display 300. In the exemplary implementation, as shown in FIG. 3, communications information 206, altimetry information 208, final approach information 210, lowest descent limit information 212, and landing runway information 214 are hidden. Missed approach information 216 and minimum safe altitude information 218, which are both pertinent to the missed approach procedure, remain visible in adjusted procedure display 300.

Presentation interface 120 switches from displaying initial procedure display 200 to displaying adjusted procedure display 300 in response to a triggering event. The triggering event may be automatically and/or manually initiated, as described herein.

In the exemplary implementation, using, for example, communication interface 140 (shown in FIG. 1), computing device 100 is in communication with a position sensor onboard the aircraft. The position sensor may include, for example, a global positioning system (GPS) sensor or an inertial navigation sensor. By communicating with the position sensor, processor 115 may detect the triggering event based on the position, trajectory, and/or attitude of the aircraft. For example, processor 115 may instruct presentation interface 120 to switch to displaying adjusted procedure display 300 when processor 115 determines, based on a position, trajectory, and/or attitude of the aircraft, that the aircraft has missed the final approach (i.e., aborted landing).

The triggering event may also be initiated manually by user 125. In the exemplary implementation, user 125 may use user input interface 135 (shown in FIG. 1) to advance the displayed image from initial procedure display 200 to adjusted procedure display 300 by, for example, pressing a button or selecting an icon. In some implementations, user input interface 135 has one or more inputs to select particular displays. For example, user input interface 135 may have a missed approach button (not shown) that, when selected, causes presentation interface 120 to display adjusted procedure display 300 for the missed approach procedure.

Notably, adjusted procedure display 300 is modifiable by user 125. That is, although adjusted procedure display 300 attempts to optimize presentation of the procedure shown, user 125 can still adjust one or more display parameters (e.g., scale, location, particular information displayed, etc.) on presentation interface 120 using user input interface 135. Accordingly, computing device 100 attempts to optimize the presentation of the displayed procedure, but does not impair the ability of user 125 to modify the display.

In the exemplary implementation, computing device 100 displays initial procedure display 200 and adjusted procedure display 300 in-flight (i.e., while the aircraft is in operation). Alternatively, computing device 100 may display initial procedure display 200 and adjusted procedure display 300 when the aircraft is not in operation. For example, user 125 can brief or familiarize for a future flight by viewing initial procedure display 200 and/or adjusted procedure display 300 prior to the actual flight.

Figure 4:
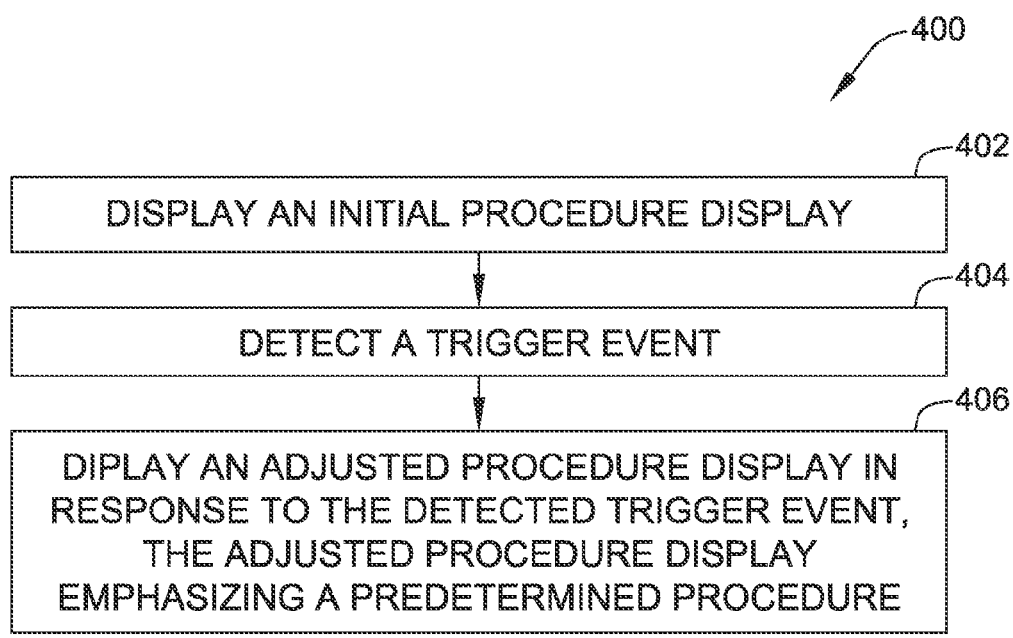
FIG. 4 is a flowchart of an exemplary method for displaying aircraft procedures.

FIG. 4 is a flowchart of an exemplary method 400 for displaying procedures for an aircraft. Method 400 may be implemented using a computing device, such as computing device 100 (shown in FIG. 1). An initial procedure display, such as initial procedure display 200 (shown in FIG. 2) is displayed 402 on a presentation interface, such as presentation interface 120 (shown in FIG. 1). A triggering event is detected 404 by a processing device coupled to the presentation interface. Processing device may be, for example, processor 115 (shown in FIG. 1). In response to the detected triggering event, an adjusted procedure display, such as adjusted procedure display 300 (shown in FIG. 3), is displayed 406 on the presentation interface. The adjusted procedure display emphasizes a predetermined portion of a procedure. For example, the adjusted procedure display may emphasize a missed approach procedure.

Figure 5:
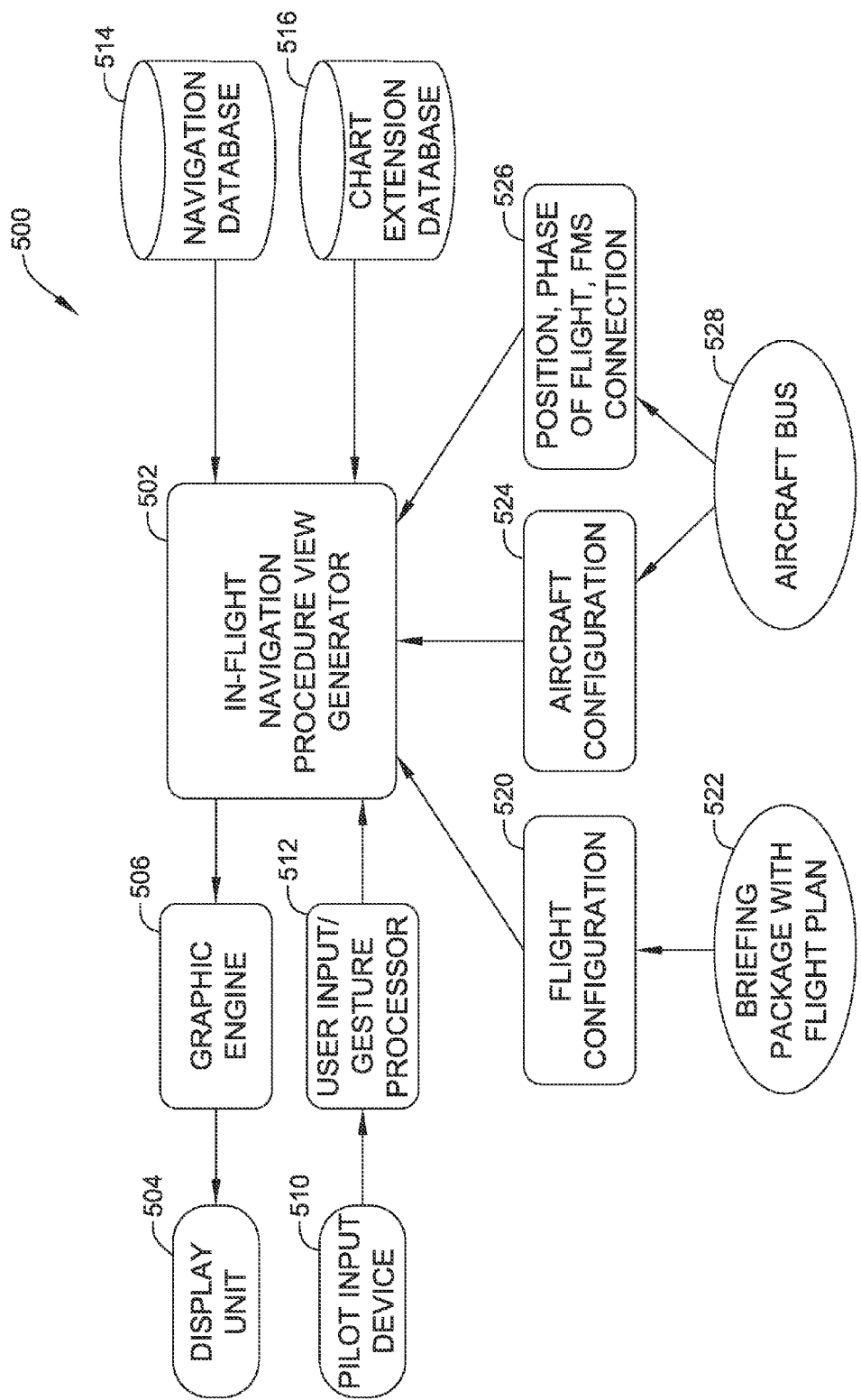
FIG. 5 is an exemplary process flow diagram that may be implemented using the computing device shown in FIG. 1.

FIG. 5 is an exemplary process flow diagram 500 that may be implemented using a computing device, such as computing device 100 (shown in FIG. 1). An in-flight navigation procedure view generator 502 controls display of the predetermined portion of the procedure on a display unit 504 using a graphic engine 506, in accordance with the implementations described herein. In the exemplary implementation, in-flight navigation procedure view generator 502 is part of processor 115 (shown in FIG. 1), and display unit 504 and graphic engine 506 are part of presentation interface 120 (shown in FIG. 1).

User input is received at a pilot input device 510 and processed by a user input/gesture processor 512. Pilot input device 510 is part of user input interface 135 (shown in FIG. 1), and user input/gesture processor 512 is part of processor 115 in the exemplary implementation. In-flight navigation procedure view generator 502 uses information stored in a navigation database 514 and/or a chart extension database 516 to display the predetermined portion of the procedure. Navigation database 514 and chart extension database 516 may be stored in, for example, memory device 110 (shown in FIG. 1).

In-flight navigation procedure view generator 502 also receives information from additional sources using, for example, communication interface 140 (shown in FIG. 1). In the exemplary implementation, in-flight navigation procedure view generator 502 receives flight configuration data 520 based on a briefing package 522 with a flight plan, and receives aircraft configuration data 524 and position, phase, and flight management system data 526 from an aircraft bus 528. Alternatively, in-flight navigation procedure view generator 502 may receive information from any source that enables in-flight navigation procedure view generator 502 to control display of the predetermined portion of the procedure.

The implementations described herein enable displaying an initial procedure display and an adjusted procedure display. The adjusted procedure display emphasizes a predetermined portion of a procedure, and is displayed in response to a triggering event. The procedure may be emphasized by modifying the scaling and/or modifying the information shown relative to the initial procedure display. By emphasizing the predetermined portion of a procedure, the systems and methods described herein aide a user in viewing and comprehending the displayed procedure, substantially eliminating a need for the user to modify the display of the procedure manually.

As compared to at least some known displays, the systems and methods described herein facilitate enhancing user viewing and understanding of displayed procedures. Specifically, unlike at least some known displays, the systems and methods described herein display an adjusted procedure display that includes an adjusted scale. Further, unlike at least some known displays, the adjusted procedure display excludes information that is extraneous to a predetermined segment, phase, or flight path of the procedure, decluttering the display for users. Moreover, unlike at least some known displays, the methods and systems described herein enable switching from an initial procedure display to an adjusted procedure display in response to a triggering event.

The implementations described herein may utilize executable instructions embodied in a non-transitory computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

Although specific features of various implementations of the disclosure may be shown in some drawings and not in others, this is for convenience only. In accordance with the principles of the disclosure, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for displaying procedures for an aircraft, said computing device comprising:
    a presentation interface;
    a user input interface; and
    a processing device coupled to said presentation interface and to said user input interface, said processing device configured to:
        cause said presentation interface to display an initial procedure display that includes information for a plurality of procedures that include at least one of an initial approach procedure, an intermediate approach procedure, a final approach procedure, and a missed approach procedure; and
        in response to a triggering event, cause said presentation interface to display an adjusted procedure display that emphasizes a predetermined portion of one procedure of the plurality of procedures by excluding information included in the initial procedure display for other procedures of the plurality of procedures and by automatically adjusting a scale of an overhead view relative to the initial procedure display by resizing and centering the predetermined portion, wherein the adjusted procedure display is distinct from an aircraft navigational display, and wherein the procedure is part of one of a standard instrument departure and a standard terminal arrival route.

2. A computing device in accordance with claim 1, wherein the triggering event is initiated based on at least one of a position, trajectory, or attitude of the aircraft.

3. A computing device in accordance with claim 2, further comprising a communication interface coupled to said processing device and configured to communicate with a position sensor to determine the position of the aircraft.

4. A computing device in accordance with claim 1, wherein the triggering event is initiated in response to an input received at said user input interface.

5. A computing device in accordance with claim 1, wherein said processing device is further configured to modify, in response to an input received at said user input interface, at least one display parameter of the initial procedure display and the adjusted procedure display.

6. A computing device in accordance with claim 1, wherein the adjusted procedure display emphasizes the predetermined portion of the procedure by including a profile view of the predetermined portion of the procedure.

7. A computing device in accordance with claim 1, wherein the adjusted procedure display emphasizes the predetermined portion of the procedure by modifying information displayed on a briefing strip relative to the initial procedure display.

8. A processing device for displaying procedures for an aircraft, said processing device configured to:
    display an initial procedure display on a presentation interface, the initial procedure display including information for a plurality of procedures that include at least one of an initial approach procedure, an intermediate approach procedure, a final approach procedure, and a missed approach procedure;
    detect a triggering event; and
    in response to the detected triggering event, display an adjusted procedure display that emphasizes a predetermined portion of one procedure of the plurality of procedures on the presentation interface by excluding information included in the initial procedure display for other procedures of the plurality of procedures and by automatically adjusting a scale of an overhead view relative to the initial procedure display by resizing and centering the predetermined portion, wherein the adjusted procedure display is distinct from an aircraft navigational display, and wherein the procedure is part of one of a standard instrument departure and a standard terminal arrival route.

9. A processing device in accordance with claim 8, wherein said processing device is configured to detect the triggering event based on at least one of a position, trajectory, or attitude of the aircraft.

10. A processing device in accordance with claim 9, wherein said processing device is configured to detect the triggering event by communicating with a position sensor that determines the position of the aircraft.

11. A processing device in accordance with claim 8, wherein said processing device is configured to detect the triggering event in response to an input received at a user input interface coupled to said processing device.

12. A method for displaying procedures for an aircraft, said method comprising:
    displaying, on a presentation interface, an initial procedure display that includes information for a plurality of procedures that include at least one of an initial approach procedure, an intermediate approach procedure, a final approach procedure, and a missed approach procedure;
    detecting, at a processing device coupled to the presentation interface, a triggering event; and displaying, in response to the detected triggering event, an adjusted procedure display on the presentation interface, wherein the adjusted procedure display emphasizes a predetermined portion of one procedure of the plurality of procedures by excluding information included in the initial procedure display for other procedures of the plurality of procedures and by automatically adjusting a scale of an overhead view relative to the initial procedure display by resizinc and centering the predetermined portion, wherein the adjusted procedure display is distinct from an aircraft navigational display, and wherein the procedure is part of one of a standard instrument departure and a standard terminal arrival route.

13. A method in accordance with claim 12, wherein displaying an adjusted procedure display comprises displaying an adjusted procedure display that includes a profile view of the predetermined portion of the procedure.

14. A method in accordance with claim 12, wherein displaying an adjusted procedure display comprises displaying an adjusted procedure display that modifies information displayed on a briefing strip relative to the initial procedure display.

* * * * *

UNITED STATES PATENT AND TRADEMARK OFFICE
CERTIFICATE OF CORRECTION

| | |
|---|---|
| PATENT NO. | : 9,260,197 B2 |
| APPLICATION NO. | : 13/676588 |
| DATED | : February 16, 2016 |
| INVENTOR(S) | : Thompson et al. |

It is certified that error appears in the above-identified patent and that said Letters Patent is hereby corrected as shown below:

In the Claims:

In Claim 12, column 8, line 52, delete "resizinc" and insert therefore -- resizing --.

Signed and Sealed this
Twenty-third Day of August, 2016

Michelle K. Lee
*Director of the United States Patent and Trademark Office*